J. A. MORRIS, JR

SWITCHING DEVICE

Filed Feb. 24, 1964

INVENTOR.
JAMES A. MORRIS JR.
BY
AGENT

United States Patent Office 3,319,077
Patented May 9, 1967

3,319,077
SWITCHING DEVICE

James A. Morris, Jr., Seattle, Wash., assignor to The Boeing Company, Seattle, Wash., a corporation of Delaware Filed Feb. 24, 1964, Ser. No. 346,761
3 Claims. (Cl. 307—88.5)

This invention relates to a switching device and more particularly to a contactless switching device for electrical circuits.

In many applications it is necessary to have a sharp "cut-off" of the flow of current. Also it might be desirable to have a switching device which provides rapid "on-off" operation without the disadvantages encountered with mechanical switches having contacts, such as corrosion and sticking.

It is therefore an object of this invention to provide a simple and inexpensive contactless "on-off" switching device.

It is a further object of this invention to provide a contactless switching device having a sharp "on-off" switching operation effected by means of a variable impedance circuit having a high quality factor "Q."

Figure 1:
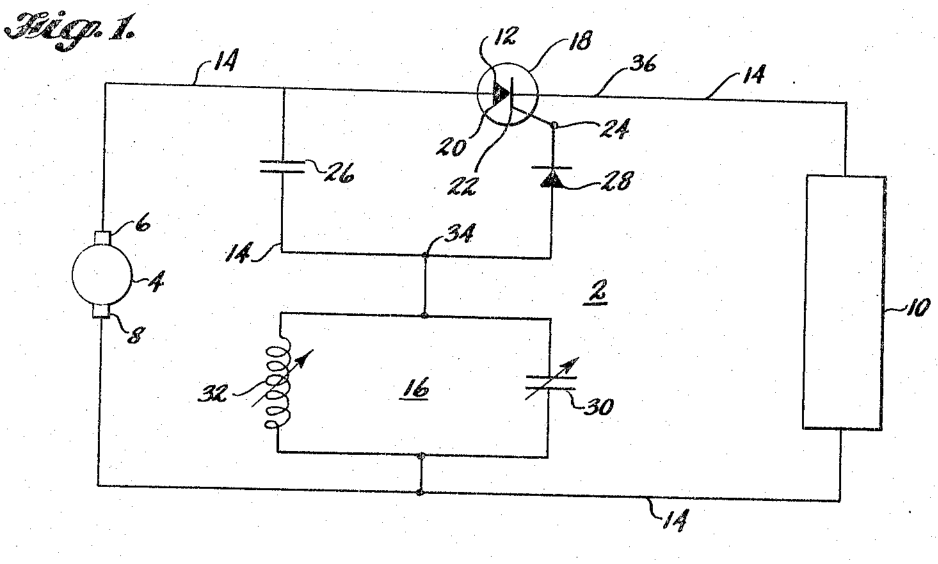
Figure 2:
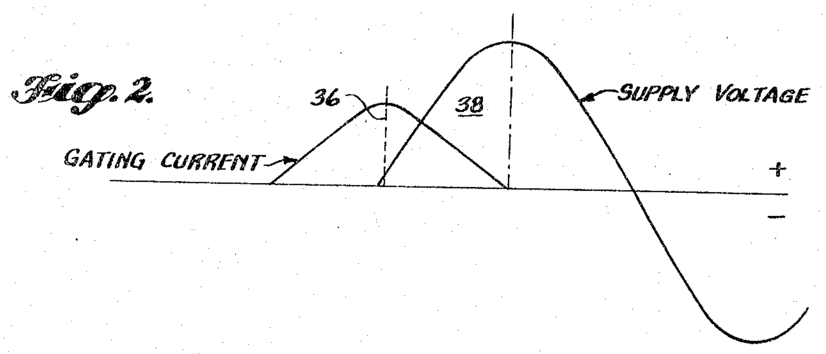

Other objects of this invention will become apparent from the following description when taken in conjunction with the accompanying drawings in which:

FIG. 1 shows a schematic diagram of the simplest configuration of this invention, and FIG. 2 shows a graph illustrating supply voltage and gating current phase relationship which occurs in the diagram shown in FIG. 1.

As illustrated in FIG. 1, the contactless switch 2 is disposed for controlling the flow of current from a supply source 4, having output terminals 6 and 8, through a load 10.

In general the switch 2 includes a gating means 12, for "on-off" switching of the current flow, connected by circuit means 14 with the supply source 4 and the load 10.

A variable impedance means 16, having a high "Q," is interconnected with the gating means 12 and the supply source 4 in such a way that the variable impedance 16 can control the gating current to the gating means 12 and thus control the flow of current through the load 10.

As illustrated, the gating means 12, for controlling the current flow from the supply source 4 to the load 10, is a silicon controlled rectifier 18 having an anode 20, a cathode 22 and a gate 24.

The circuit means 14 connects the output terminal 6 of the supply source 4 to the anode 20 of the gating means 12 and connects the cathode 22 to the load 10. Circuit means 14 also connects the load 10 to the output terminal 8.

A capacitor 26, for restricting the current flow from the supply source 4 when the impedance 16 is detuned and for effecting a 90° phase shift of the gating current with respect to the supply voltage, is connected by circuit means 14 to terminal 6 and capacitor 26 is further connected by circuit means 14 in series with a blocking diode 28 to gate 24. The blocking diode 28 functions as a protection for the gate 24 of the silicon controlled rectifier 18. It is common practice to protect the gate of a silicon controlled rectifier if there is a possibility that the gate could swing more negative than the allowed specified value.

The variable impedance means 16, for controlling the gate current magnitude, is shown to include a variable capacitance 30 connected in parallel circuit relationship with a variable inductance 32.

Referring now to FIG. 1, assume that impedance 16 is tuned and the supply source 4 supplies an A.C. voltage, then during the first positive half cycle of the A.C. voltage (with the output terminal 6 positive with respect to the output terminal 8), point 34 will have a higher positive potential as compared with point 36 and thus a gating current will flow from terminal 6 through capacitor 26, through blocking diode 28, through gate 24 toward load 10. However, this gating current will be 90° out of phase with the supplied voltage by the effect of the capacitor 30.

As shown in FIG. 2 the gating current reaches its highest magnitude 36 during the initial positive rise of the supply voltage.

So far as known to persons familiar with the art of silicon controlled rectifiers, gating of the silicon controlled rectifier is accomplished by a gating current with a high positive magnitude during the first half of the positive amplitude of the supply voltage.

Thus, referring to FIG. 2, the gating current magnitude 36 renders gating means 12 conductible and closes the circuit to load 10. The supply current will flow from terminal 6 of supply source 4 through gating means 12, load 10 to terminal 8 of supply source 4.

Assuming that impedance 16 is tuned and the supply source 4 supplies an A.C. voltage, then during the first negative half cycle of the A.C. voltage, with the output terminal 6 negative with respect to the output terminal 8, the supply current will not flow from terminal 8, through load 10 to the silicon controlled rectifier 18 or the blocking diode 28 because both the silicon controlled rectifier 18 as well as the blocking diode 28 oppose any current flow from that direction.

Assuming that the supply source 4 supplies an A.C. voltage at its terminals 6 and 8, and impedance 16 is detuned, then this slight change of detuning either capacitor 30 or inductor 32 results in a low value of impedance 16, because of the high quality "Q" factor of impedance 16. Then for all practical purposes point 34 can be considered as being connected directly to terminal 8, thus rendering point 34 more negative than point 36, and thus, there will be no gate current and, therefore, the gating means 12 will be nonconductive to the supply current. Thus, when impedance means 16 is detuned, the load 10 will be disconnected from the supply source 4. The supply current will then flow from terminal 6 of the supply source 4, through capacitor 26, through the low impedance means 16 toward terminal 8 and vice versa.

Capacitor 26 will limit the current flow and thus avoid short circuiting the supply source 4.

As mentioned above, the low value of impedance 16 when detuned is a result of the high "Q" factor; however, it also results in a very sensitive and immediate "cut-off" feature of the contactless switch 2, which is desirable and an advantage compared with other switching systems.

Instead of using a silicon controlled rectifier 18, it should be understood that any other equivalent electronic component, such as a thyratron, will suffice. Therefore, without departing from the spirit and scope of this invention, it is intended that all matter contained in the foregoing description, or shown in the accompanying drawings, shall be interpreted as illustrative and not in a limiting sense.

I claim:

1. In an "on-off" power switch for controlling the flow of current from a supply source through a load, said current returning through a ground to said supply source, the combination comprising, (1) gating means, having an anode, a cathode and a control gate, (2) circuit means for interconnecting the anode of said gating means with the supply source and the cathode of said gating means with the load in order that said gating means gates the flow of current from the supply source through the load and thence through the ground back to the source, and (3) variable impedance means, comprising a dual-purpose coupling-and-current-limiting capacitor connecting said anode and said control gate and a high "Q," resonant circuit interconnected between said control gate and said ground to said supply source whereby the tuning of said high "Q" resonant circuit controls the gating of current by said gating means through the load, said dual-purpose capacitor providing leading control gate current for immediate full-cycle conduction when said "on-off" power switch is "on" and providing current-limiting impedance when said "on-off" power switch is "off" in which "off" condition said high "Q" resonant circuit simultaneously shorts to ground both said anode through said dual-purpose capacitor and also said connection from said dual-purpose capacitor to said control gate.

2. The combination as defined in claim 1 wherein said high "Q" resonant circuit is a variable combination capacitance and inductance.

3. The combination as defined in claim 2, wherein said high "Q" resonant circuit is a parallel circuit, one branch of which is a variable inductance and the other branch of which is a variable capacitance.

References Cited by the Examiner

UNITED STATES PATENTS

| | | | |
|---|---|---|---|
| 3,128,422 | 4/1964 | Brown | 321—45 |
| 3,189,748 | 6/1965 | McMurray | 307—41 |
| 3,210,571 | 10/1965 | Hutson | 307—88.5 |

OTHER REFERENCES

Brown, "Wide-Angle Phase Shifter," Electronics, March 1955.

JOHN F. COUCH, *Primary Examiner.*

K. D. MOORE, S. WEINBERG, *Assistant Examiners.*